United States Patent
Kuroki et al.

(10) Patent No.: US 7,226,685 B2
(45) Date of Patent: Jun. 5, 2007

(54) CONSTITUENT PART FOR FUEL CELL

(75) Inventors: Yuichi Kuroki, Fujisawa (JP);
Tomohiro Inoue, Fujisawa (JP)

(73) Assignee: NOK Corporation, Tokyo (JP)

( * ) Notice: Subject to any disclaimer, the term of this patent is extended or adjusted under 35 U.S.C. 154(b) by 528 days.

(21) Appl. No.: 10/380,465

(22) PCT Filed: May 23, 2001

(86) PCT No.: PCT/JP01/04316

§ 371 (c)(1),
(2), (4) Date: Mar. 19, 2003

(87) PCT Pub. No.: WO02/43172

PCT Pub. Date: May 30, 2002

(65) Prior Publication Data

US 2004/0096730 A1    May 20, 2004

(30) Foreign Application Priority Data

Nov. 21, 2000 (JP) ............................. 2000-353852
Dec. 5, 2000 (JP) ............................. 2000369647

(51) Int. Cl.
*H01M 2/08* (2006.01)

(52) U.S. Cl. ............................. 429/35; 429/34; 429/40
(58) Field of Classification Search .................. 429/57, 429/34–39, 129–147
See application file for complete search history.

(56) References Cited

U.S. PATENT DOCUMENTS

| | | | | |
|---|---|---|---|---|
| 5,187,025 A | * | 2/1993 | Kelland et al. | 429/33 |
| 5,264,299 A | | 11/1993 | Krasij et al. | 429/30 |
| 6,057,054 A | * | 5/2000 | Barton et al. | 429/42 |
| 6,080,503 A | * | 6/2000 | Schmid et al. | 429/35 |
| 6,231,053 B1 | * | 5/2001 | Wakamatsu | 277/628 |

FOREIGN PATENT DOCUMENTS

| | | |
|---|---|---|
| JP | 5-101837 | 4/1993 |
| JP | 8-45517 | 2/1996 |
| JP | 8-148169 | 6/1996 |
| JP | 2000-133288 | 5/2000 |
| JP | 2000-223134 | 8/2000 |
| WO | WO99/04446 | 1/1999 |

* cited by examiner

*Primary Examiner*—Susy Tsang-Foster
*Assistant Examiner*—Alix Echelmeyer
(74) *Attorney, Agent, or Firm*—Jacobson Holman PLLC (57) ABSTRACT

In order to reduce an assembling man hour of the constituting part for the fuel battery and prevent wrinkles from being generated in an electrolyte membrane, in a constituting part for a fuel battery having electrodes with catalyst in both pole sides of an electrolyte membrane and provided with gas diffusion layers for promoting diffusion of gas in both outer sides thereof, an integrated product between the gas diffusion layers and the gasket, the gas diffusion layers being made of a carbon fiber or the like and impregnated with a rubber, and forming gaskets is bonded to an integrated product of the electrolyte membrane and the electrodes with catalyst by using a hot press.

3 Claims, 7 Drawing Sheets

CONSTITUENT PART FOR FUEL CELL

This is a nationalization of PCT/JP01/04316, filed May 23, 2001 and published in Japanese.

TECHNICAL FIELD

The present invention relates to a constituting part for a fuel battery forming an assembly of constituting elements for the fuel battery.

BACKGROUND OF THE INVENTION

The fuel battery has a separator (collector electrode) constituted by a carbon plate or the like, an electrode with catalyst (catalyst layer) carrying a Pt catalyst and an electrolyte membrane (ion exchange membrane), for reacting a gas, a gas diffusion layer (GDL) made of a carbon fiber or the like for promoting a diffusion of gas, and a gasket (seal) for sealing the gas or a refrigerant, as main constituting elements.

However, in the prior art, since the structure is made such that these constituting elements are sequentially assembled at a time of assembling into the fuel battery, there is a problem that a lot of labor and time are required for the assembly, in particular, in order to assemble the electrolyte membrane and the electrodes with catalyst, positioning is necessary because the position is hard to be fixed.

In this case, with respect to the assembly of the electrolyte membrane and the electrodes with catalyst, at present, there has been developed a method of connecting both of them by using a hot press (refer to Japanese Unexamined Patent Publication No. 2000-223134), and it is accordingly possible to utilize a reaction electrode portion (MEA) corresponding to an integrated product of the electrolyte membrane and the electrodes with catalyst as a single constituting element.

However, even when the electrolyte membrane and the electrodes with catalyst are integrally formed as mentioned above, it is necessary to insert the gasket between the separator and the electrolyte membrane at a time of assembling them. Accordingly, in conventional, the gaskets are assembled so as to hold the electrolyte membrane from both sides of the electrolyte membrane, however, since it is hard to position the electrolyte membrane, there is a problem that wrinkles are generated in the electrolyte membrane at a time of assembling.

Further, there has been developed a structure in which the gasket is integrally formed with the separator in the side of the electrolyte membrane (refer to Japanese Unexamined Patent Publication No. 2000-133288), however, even in the separator with gasket of this kind, there is the same problem in the case of holding the electrolyte membrane.

Further, in general, the fuel battery system is an expensive, in particular, the reaction electrode portion is an expensive part, and therefore a cost saving thereof is required. According to NEDO report in 1999 (New Energy Industrial Technology Comprehensive Development Commission Research Result Report in 1999, Search Concerning Standard Tool for Developing Solid Polymer Type Fuel Battery: Table 2. 2-1 Cost Comparison of Standard Tool at Mass Production), the reaction electrode portion is most expensive.

The present invention is made by taking the points mentioned above into consideration, and an object of the present invention is to provide a constituting part for a fuel battery which can reduce an assembling man hour of the constituting part for the fuel battery, and can prevent wrinkles from being generated in an electrolyte membrane.

Further, another object is to provide a constituting part for a fuel battery which can reduce an assembling man-hour by previously integrating respective parts constituting a cell in a stack for a fuel battery, and in addition thereto, another object is to provide a constituting part for a fuel battery which can reduce a part cost by reducing a plane area of a reaction electrode portion corresponding to a comparatively expensive part.

DISCLOSURE OF THE INVENTION

In order to achieve the object mentioned above, in accordance with a first aspect of the present invention, there is provided a constituting part for a fuel battery comprising:

electrodes with catalyst provided in both pole sides of an electrolyte membrane; and gas diffusion layers for promoting diffusion of gas, the gas diffusion layers being provided in both outer sides thereof, characterized in that the gas diffusion layers formed by a carbon fiber or the like and gaskets are bonded to an integrated product of the electrolyte membrane and the electrodes with catalyst.

Further, in accordance with a second aspect of the present invention, there is provided a constituting part for a fuel battery comprising:

electrodes with catalyst provided in both pole sides of an electrolyte membrane; and gas diffusion layers for promoting diffusion of gas, the gas diffusion layers being provided in both outer sides thereof, characterized in that an integrated product of the gas diffusion layers and the gaskets, the gas diffusion layers being made of a carbon fiber or the like and impregnated with a rubber, and forming a gaskets, is bonded to an integrated product of the electrolyte membrane and the electrodes with catalyst.

Further, in accordance with a third aspect of the present invention, there is provided a constituting part for a fuel battery comprising:

electrodes doubling as gas diffusion layers provided in both sides of an electrolyte membrane, characterized in that an integrated product of the gas diffusion layers and the gaskets is bonded to the electrolyte membrane, the gas diffusion layer being impregnated with a rubber and forming gaskets.

Further, in accordance with a fourth aspect of the present invention, there is provided a constituting part for a fuel battery as recited in any one of the second and third aspects mentioned above, characterized in that the integrated product is bonded by using a hot press.

Further, in accordance with a fifth aspect of the present invention, there is provided a constituting part for a fuel battery as recited in any one of the first to fourth aspects mentioned above, characterized in that the electrolyte membrane is made of a high polymer electrolyte.

Further, in accordance with a sixth aspect of the present invention, there is provided a constituting part for a fuel battery as recited in any one of the first to fourth aspects mentioned above, characterized in that the rubber is a liquid rubber.

Further, in accordance with a seventh aspect of the present invention, there is provided a constituting part for a fuel battery, characterized in that a reaction electrode portion, gas diffusion layers and gaskets are integrated.

Further, in accordance with an eighth aspect of the present invention, there is provided a constituting part for a fuel battery as recited in the seventh aspect mentioned above, characterized in that frames made of a resin film are fixed to an outer periphery of the reaction electrode portion so as to expand a plane area.

Further, in accordance with a ninth aspect of the present invention, there is provided a constituting part for a fuel battery as recited in the eighth aspect mentioned above, characterized in that the reaction electrode portion, the frames, the gaskets and the gas diffusion layers are integrated by fixing the frames to the reaction electrode portion, covering the frames by a rubber and impregnating the gas diffusion layers with a part of the rubber.

Further, in accordance with a tenth aspect of the present invention, there is provided a constituting part for a fuel battery, characterized in that a reaction electrode portion and a gaskets are integrated on the assumption that a gas diffusion layers are not included in constituting parts of a cell.

Further, in accordance with an eleventh aspect of the present invention, there is provided a constituting part for a fuel battery as recited in the tenth aspect mentioned above, characterized in that frames made of a resin film are fixed to an outer periphery of the reaction electrode portion so as to expand a plane area.

Further, in accordance with a twelfth aspect of the present invention, there is provided a constituting part for a fuel battery as recited in the eleventh aspect mentioned above, characterized in that the reaction electrode portion, the frames and the gaskets are integrated by fixing the frames to the reaction electrode portion and impregnating with a rubber so as to cover the frame.

Further, in accordance with a thirteenth aspect of the present invention, there is provided a constituting part for a fuel battery as recited in any one of the ninth aspect and the twelfth aspect mentioned above, characterized in that the outer periphery of the reaction electrode portion and the frames are coated by a rubber.

Further, in accordance with a fourteenth aspect of the present invention, there is provided a constituting part for a fuel battery as recited in any one of the ninth aspect and the twelfth aspect mentioned above, characterized in that the reaction electrode portion and the frames are connected by charging a rubber into through holes provided in the reaction electrode portion and the frames.

Further, in accordance with a fifteenth aspect of the present invention, there is provided a constituting part for a fuel battery as recited in the ninth aspect mentioned above, characterized in that the reaction electrode portion, the frames, the gaskets, the gas diffusion layers and separators are integrated by also impregnating the separators with a rubber.

Further, in accordance with a sixteenth aspect of the present invention, there is provided a constituting part for a fuel battery as recited in the twelfth aspect mentioned above, characterized in that the reaction electrode portion, the frames, the gaskets and a separators are integrated by also impregnating the separators with a rubber.

Further, in accordance with a seventeenth aspect of the present invention, there is provided a constituting part for a fuel battery as recited in any one of the fifteenth aspect and the sixteenth aspect mentioned above, characterized in that a gas seal made of a material excellent in a gas impermeability rather than the gasket is provided in an outer periphery of the gaskets.

When the gas diffusion layers formed by the carbon fiber or the like and the gaskets are bonded to the integrated product of the electrolyte membrane and the electrodes with catalyst, as in the constituting part for the fuel battery in accordance with the first aspect of the present invention provided with the structure mentioned above, or when the integrated product of the gas diffusion layers and the gaskets, the gas diffusion layers being made of the carbon fiber or the like and impregnated with the rubber, and forming the gaskets is bonded to the integrated product of the electrolyte membrane and the electrodes with catalyst, as in the constituting part for the fuel battery in accordance with the second aspect of the present invention, these parts are previously integrated, so that it is possible to reduce steps of assembling these parts with each other at a time of assembling of the fuel battery. Further, since the electrolyte membrane is included in these parts and the electrolyte membrane is previously integrated with the other parts, it is possible to prevent wrinkles from being generated in the electrolyte membrane at a time of assembling.

Further, as in the constituting part for the fuel battery in accordance with the third aspect of the present invention provided with the structure mentioned above, in the constituting part for the fuel battery provided with the electrodes doubling as the gas diffusion layers in both sides of the electrolyte membrane, when the integrated product of the gas diffusion layers and the gaskets, the gas diffusion layers being impregnated with the rubber and forming the gaskets, is bonded to the electrolyte membrane, these parts are also previously integrated, so that it is possible to reduce steps of assembling these parts with each other at a time of assembling of the fuel battery. Further, since the electrolyte membrane is included in these parts and the electrolyte membrane is previously integrated with the other parts, it is possible to prevent wrinkles from being generated in the electrolyte membrane at a time of assembling.

For the bonding of the integrated product mentioned above, it is preferable to employ a thermo compression bonding means given by the hot press (the fourth aspect), and it is preferable that a structure made of the high polymer electrolyte is used for the electrolyte membrane (the fifth aspect).

Further, for the rubber used in the present invention, there can be listed up a saturated type rubber such as a butyl rubber, an ethylene propylene rubber, a fluorine-contained rubber, a silicone rubber, an acrylic rubber, a fluoro silicon rubber, a fluoro acrylic rubber, a nitrile hydride rubber and the like, or the same group of liquid type rubbers, and among them, the liquid type rubber is particularly preferable in view of sealing property since it is excellent in an impregnating ability into the gas diffusion layer or the electrode doubling as the gas diffusion layer, and it is excellent in an adhesion to the electrolyte membrane even when the pressure and the temperature of the hot press are low, or the like (the sixth aspect).

In this case, in connection with the invention in accordance with the first aspect to the sixth aspect mentioned above, the following technical matters are contained in the present application.

That is, the present application proposes the following technical matters in order to achieve the object mentioned above.

① A product in which the gas diffusion layers formed by the carbon fiber or the like and the gaskets are bonded to the integrated product (MEA) of the electrolyte membrane and the catalyst electrodes, in the fuel battery having the catalyst electrodes in both pole sides of the electrolyte membrane, and provided with the gas diffusion layers for promoting diffusion of gas in both outer sides thereof.

② A bonded body of the MEA, the gas diffusion layers and the gaskets in which the integrated product of the gas diffusion layers and the gaskets, the gas diffusion layers being made of the carbon fiber or the like and impregnated with a rubber, and forming the gaskets, is bonded to the integrated product (MEA) of the electrolyte membrane and the catalyst electrodes, in the fuel battery having the catalyst electrodes in both pole sides of the electrolyte membrane, and provided with the gas diffusion layers for promoting diffusion of gas in both outer sides thereof.

③ A bonded body of the MEA, the gas diffusion layers and the gaskets in which the integral product of the gas diffusion layers and the gaskets, the gas diffusion layers being made of the carbon fiber or the like and impregnated with a rubber, and forming the gaskets is bonded to the integrated product (MEA) of the electrolyte membrane and the catalyst electrodes by using the hot press, in the fuel battery having the catalyst electrodes in both pole sides of the electrolyte membrane, and provided with the gas diffusion layers for promoting diffusion of gas in both outer sides thereof.

④ A product in which the integrated product of the gas diffusion layers and the gaskets, the gas diffusion layers being impregnated with the rubber, and forming the gasket, is bonded to the electrolyte membrane, in the fuel battery provided with the electrodes doubling as the gas diffusion layers provided in both sides of the electrolyte membrane.

⑤ A product in which the integrated product of the gas diffusion layers and the gaskets, the gas diffusion layers being impregnated with the rubber and forming the gaskets, is bonded to the electrolyte membrane by using the hot press, in the fuel battery provided with the electrodes doubling as the gas diffusion layers provided in both sides of the electrolyte membrane.

⑥ A bonding element part of the fuel battery characterized in that the electrolyte membrane is made of the high polymer electrolyte, in the items ① to ⑤.

The proposed matter mentioned above proposes the "product in which the MEA (the bonded product of the electrolyte membrane and the catalyst electrode or the electrodes with the catalyst), the gas diffusion layers and the gaskets are integrated", and further, on the assumption of the type in which the catalyst electrode or the electrode with the catalyst is not included as a single constituting element, there is proposed the "product in which the electrolyte membrane, the gas diffusion layers and the gaskets are integrated". In accordance with one manufacturing method for manufacturing the integrated product mentioned above, the integrated product of the gas diffusion layer and the gasket formed by impregnating with the rubber into the gas diffusion layer is pressure connected to the electrolyte membrane by using the hot press.

In this case, in the case of pressure connecting the integrated product of the gas diffusion layer and the gasket to the MEA, the integrated product of the gas diffusion layer and the gasket is pressure connected to the portion corresponding to the outer peripheral portion of the electrode in the MEA in which the electrolyte membrane is exposed, by using the hot press.

Further, in the case of pressure connecting the integrated product of the gas diffusion layer and the gasket doubling as the electrode to the electrolyte membrane, a whole of the portion being in contact with the electrolyte membrane is pressure connected.

Further, by integrating the MEA, the gas diffusion layer and the gasket in the manner mentioned above, or by integrating the electrolyte membrane, the gas diffusion layer and the gasket, it is possible to reduce a man hour at a time of assembling of the fuel battery, and it is possible to resolve a problem concerning a displacement between the membrane and the seal portion.

Further, as in the constituting part for the fuel battery in accordance with the seventh aspect of the present invention provided with the structure mentioned above, when the reaction electrode portion, the gas diffusion layers and the gaskets are integrated, these parts are previously integrated, so that it is possible to reduce an assembling man hour, and further, as in the constituting part for the fuel battery in accordance with the eighth aspect of the present invention, when the frames made of the resin film are fixed to the outer periphery of the reaction electrode portion so as to expand the plane area, it is possible to reduce the plane area of the reaction electrode portion at a degree at which the frames are added, so that a rate at which the reaction electrode portion corresponding to an expensive part is used is reduced, and it is accordingly possible to reduce the part cost. In this case, in order to integrate the reaction electrode portion, the gas diffusion layers and the gaskets, as described in the ninth aspect, it is preferable that the reaction electrode portion, the frames, the gaskets and the gas diffusion layers are integrated by fixing the frames to the reaction electrode portion, covering the frames by the rubber and impregnating the gas diffusion layers with the part of the rubber.

Further, as in the constituting part for the fuel battery in accordance with the tenth aspect of the present invention provided with the structure mentioned above, when the reaction electrode portion and the gaskets are integrated, these parts are previously integrated, so that it is possible to reduce an assembling man hour, and as in the constituting part for the fuel battery in accordance with the eleventh aspect of the present invention, when the frames made of the resin film are fixed to the outer periphery of the reaction electrode portion so as to expand a plane area, it is possible to reduce the plane area of the reaction electrode portion at a degree at which the frame is added, so that a rate at which the reaction electrode portion corresponding to an expensive part is used is reduced, and it is accordingly possible to reduce the part cost. In this case, in order to integrate the reaction electrode portion and the gasket, as described in the twelfth aspect, it is preferable that the reaction electrode portion, the frames and the gasket are integrated by fixing the frames to the reaction electrode portion and impregnating with the rubber so as to cover the frames.

Further, in the constituting part for the fuel battery in accordance with the thirteenth aspect of the present invention, since the reaction electrode portion and the outer periphery of the frames are coated by the rubber, it is possible to restrict the gas generated in the inner portion of the cell from leaking from the reaction electrode portion and the outer periphery of the frame to the external, and in the constituting part for the fuel battery in accordance with the fourteenth aspect of the present invention, since the reaction electrode portion and the frames are connected by charging the rubber into through holes provided in the reaction electrode portion and the frames, it is possible to firmly fasten the reaction electrode portion and the frames.

Further, in accordance with the fifteenth aspect of the present invention, in the constituting part for the fuel battery as recited in the ninth aspect mentioned above, since the reaction electrode portion, the frames, the gaskets, the gas diffusion layers and the separators are integrated by also impregnating the separators with the rubber, it is possible to integrate the parts group including the separators, and further in accordance with the sixteenth aspect of the present invention, in the constituting part for the fuel battery as recited in the twelfth aspect mentioned above, since the reaction electrode portion, the frames, the gaskets and the separators are integrated by also impregnating the separators with the rubber, it is also possible to integrate the parts group including the separators.

Further, in accordance with the seventeenth aspect of the present invention, in the constituting part for the fuel battery as recited in the fifteenth aspect or the sixteenth aspect mentioned above, since the gas seal made of the material excellent in the gas impermeability rather than the gasket is provided in the outer periphery of the gaskets, it is possible to prevent the gas from leaking to the external for the sake of the gas seal, even when the gas impermeability of the cell seal portion is not good enough.

In this case, the impregnation means a penetration into a porous portion in the GSL or the electrode, or a penetration into rugged portions of the surface or voids in the resin film or the separator. Further, the resin film may be porous, and the resin film and the separator may be roughened on the surface.

In connection with the present invention in accordance with the seventh aspect to the seventeenth aspect, the following technical matters are included in the present application.

That is, one constituting part for the fuel battery proposed by the present application is characterized in that the MEA (electrolyte membrane+reaction electrodes), the gas diffusion layers (GDL) and the gaskets are integrated for achieving the object mentioned above, and the area of the expensive MEA is reduced.

Further, the following technical matters are included.

① A cell seal for a fuel battery in which the MEA, the GDL's and the gaskets are integrated.

② A structure characterized in that frames of a resin film such as a polyimide (PI), a polyamide imide, a polyethylene naphthalate (PEN), a polyethylene terephthalate (PET), a polybutylene terephthalate (PBT) or the like is provided in an outer periphery of the MEA, for the purpose of achieving a cost saving of the MEA.

③ A shape in which the MEA and the resin frame outer periphery are coated with the rubber, for improving a gas leak property.

④ A structure in which a through hole is provided and connection is made by the rubber at a time of molding, for improving a fastening force between the resin frame and the MEA.

⑤ A structure in which integrally forming is made including the GDL by using the liquid rubber.

⑥ A structure in which the separators are further integrated and a rubber having an improved gas permeability is provided in the outer periphery or a latex covers the outer periphery, in the case that the gas permeability of the cell seal portion is insufficient.

In the above item ②, since the MEA is expensive, the other portions than the power generating portions in the separators are formed by the resin frames made of the PI, the PEN, the PET or the like which are thermally compression bonded to the MEA, in place of the MEA. The structure is made such that the through hole is provided from the resin frames in the MEA sandwiched by the resin frames, and the rubber passes there through, thereby holding even when the thermo compression bonded portion is peeled off at a time of using (the item ④ mentioned above).

Further, in the case of using the GDL's in conjunction therewith, they are integrated by inserting the MEA with the resin frames and the GDL's into the molding die, and molding with the liquid rubber (the item ⑤ mentioned above). Since the rubber is impregnated, there is no gas leak from the GDL's to the outer periphery, however, since there is a risk that the gas leaks from the outer periphery of the MEA with the resin frames, there is formed a shape in which the rubber surrounds the outer periphery of the MEA with the resin frames at a time of molding (the item ③ mentioned above).

Further, the silicone rubber, the ethylene propylene rubber, the butyl rubber, the fluorine-contained rubber or the like is used for the liquid rubber, however, in the case that there is a problem concerning the gas permeability in these rubber materials, the outer peripheral portion is coated with the rubber having an improved gas permeability integrally with the separators (the item ⑥ mentioned above). The structure in this case includes the case of forming with the rubber to coat, and the case of applying the latex.

In accordance with the structure mentioned above, the following function and effects can be achieved.

① Since the MEA, the GDL's and the gaskets are integrated, the number of parts to be assembled is reduced from five parts to one part, so that it is possible to widely reduce an assembling man hour.

② Since the area of the MEA to be used is widely reduced by employing the MEA with the resin frames, a cost saving can be achieved. In an example of a commercially available test stack, they are of the MEA is reduced at about 30 to 50%.

③ The displacement of the MEA is not generated by fixing the MEA to the resin frames via the through hole.

④ An air leak from the outer periphery is not generated even when the thermo compression bonding between the MEA and the resin frame is insufficient, since the outer periphery is covered by the rubber.

⑤ Since the MEA integrated cell seal is sandwiched by the separators and the rubber is formed in the outer periphery, the gas permeation to the outer portion is reduced by the rubber thickness.

BEST MODE FOR CARRYING OUT THE INVENTION

Next, a description will be given of embodiments in accordance with the present invention with reference to the accompanying drawings.

First Embodiment

Figure 1:
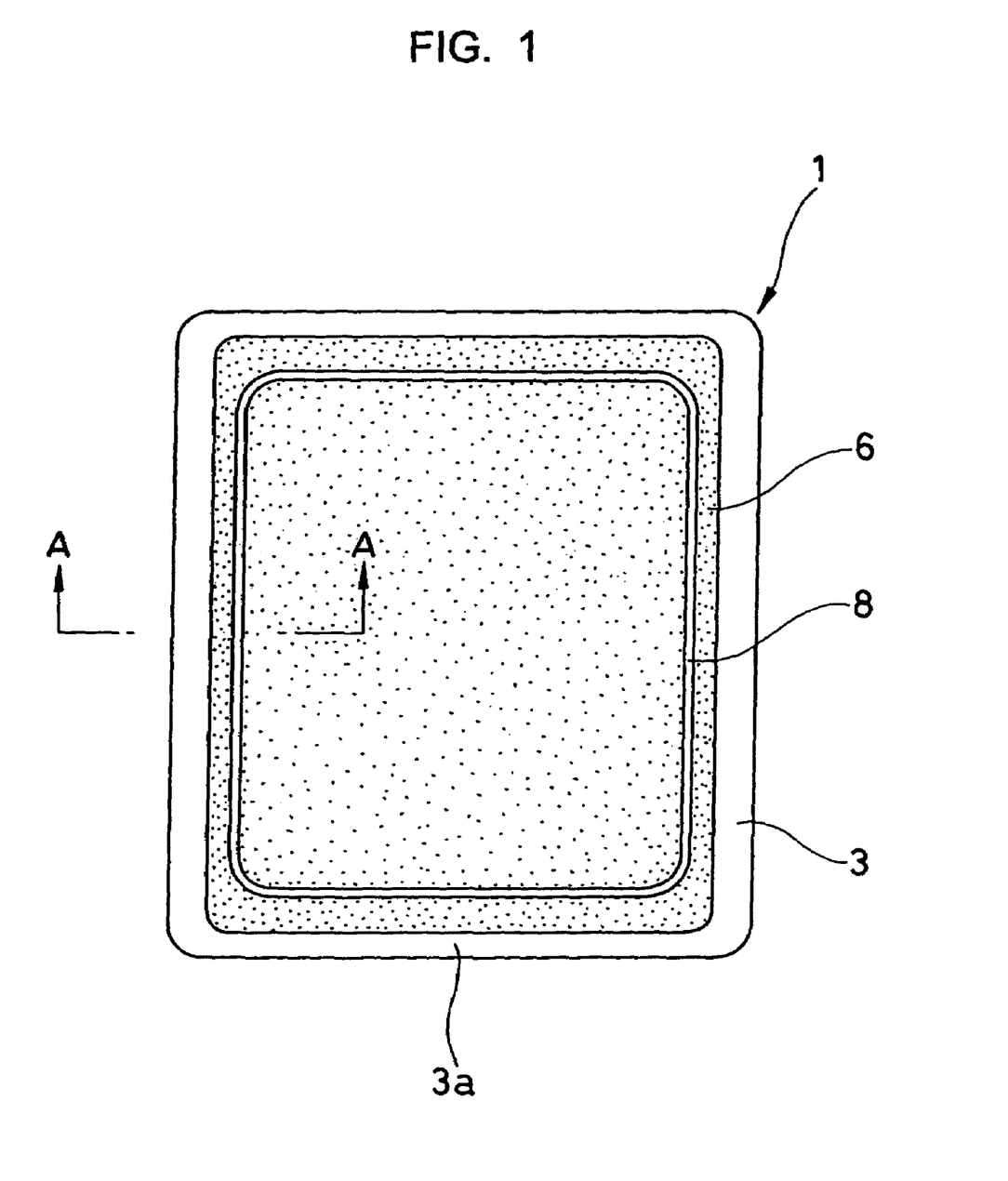
FIG. 1 is a plan view of a constituting part for a fuel battery in accordance with a first embodiment of the present invention.
Figure 2:
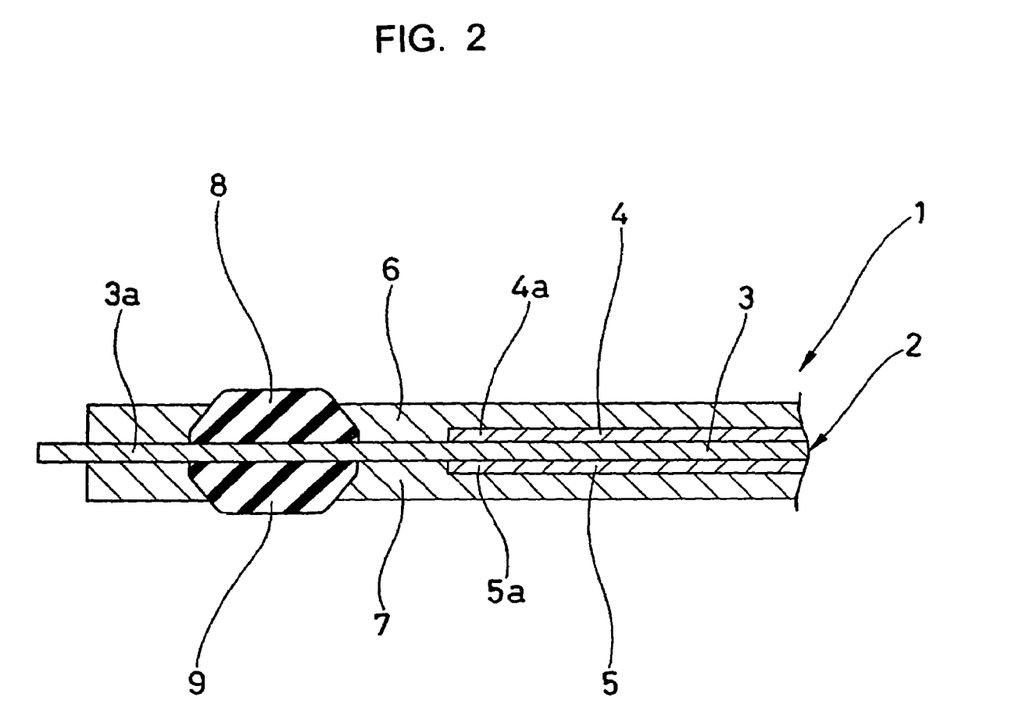
FIG. 2 is an enlarged cross sectional view along a line A—A in FIG. 1.
Figure 3:
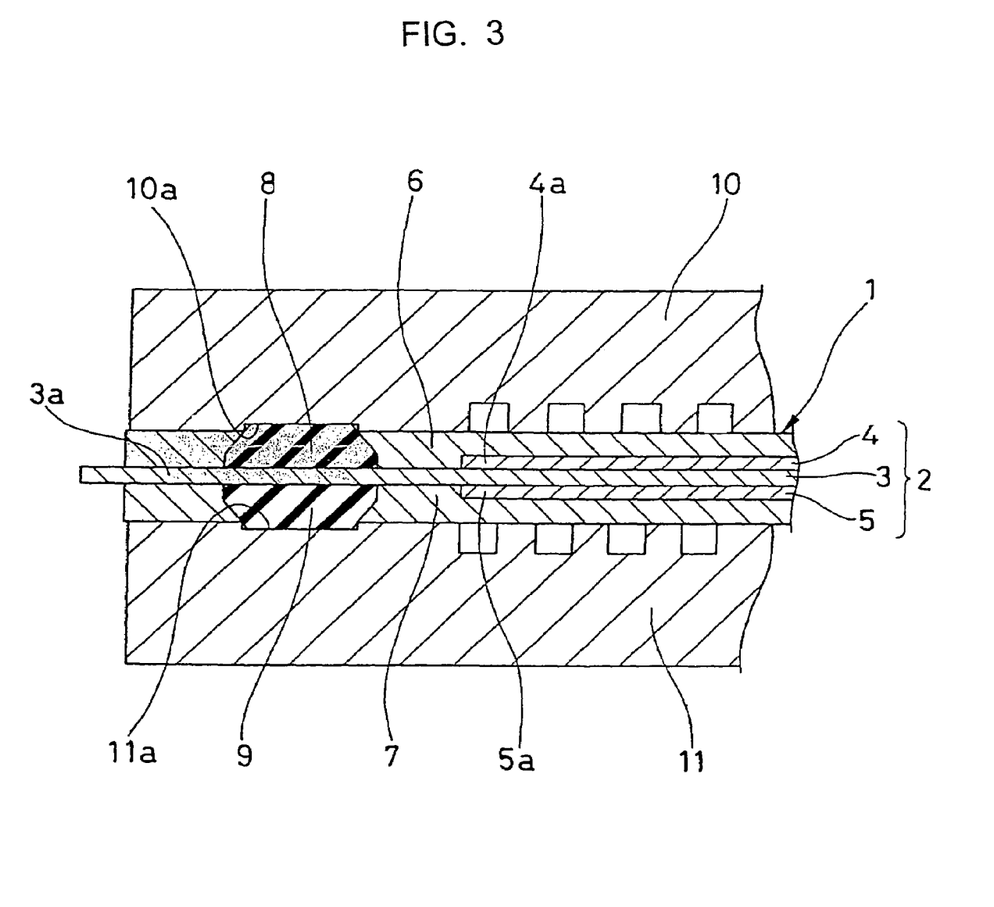
FIG. 3 is a cross sectional view of a main portion showing an assembling state of the constituting part for the fuel battery.

FIG. 1 shows a plan view of a constituting part 1 for a fuel battery in accordance with a first embodiment of the present invention, and an enlarged cross sectional view along a line A—A thereof is shown in FIG. 2. Further, FIG. 3 shows a cross sectional view of an assembling state of the constituting part 1 for the fuel battery, and reference numerals 10 and 11 in FIG. 3 denote separators combined with the fuel battery constituting part 1.

The fuel battery constituting part 1 in accordance with the embodiment mentioned above is structured as follows.

That is, at first, a reaction electrode portion (MEA: Membrane Electrode Assembly) 2 corresponding to an integrated product of an electrolyte membrane 3 and electrodes with catalyst 4 and 5 is provided, the electrodes with catalyst 4 and 5 being fixed respectively to each of both pole sides or both surfaces of the electrolyte membrane 3 made of a solid high polymer and provided with a predetermined plan shape, and gas diffusion layers 6 and 7 made of a carbon fiber, and gaskets 8 and 9 made of a rubber cured material are respectively bonded to each of both surfaces of the reaction electrode portion 2.

In the reaction electrode portion 2 mentioned above, a peripheral edge portion 3a of the electrolyte membrane 3 protrudes in the plane direction beyond peripheral edge portions 4a and 5a of the electrodes with catalyst 4 and 5, the upper gas diffusion layer 6 is arranged in the upper side of the electrode with catalyst 4 in the upper side in the drawing and the upper side of the peripheral edge portion 3a of the electrolyte membrane 3, and the lower gas diffusion layer 7 is arranged in the lower side of the electrode with catalyst 5 in the lower side in the drawing and the lower side of the peripheral edge portion 3a of the electrolyte membrane 3. Further, the upper gasket 8 is arranged in the upper side of the peripheral edge portion 3a of the electrolyte membrane 3, and the lower gasket 9 is arranged in the lower side of the peripheral edge portion 3a of the electrolyte membrane 3.

A combination of the gas diffusion layer 6 in the upper side in the drawing and the gasket 8, and a combination of the gas diffusion layer 7 in the lower side in the drawing and the gasket 9 are respectively integrated by impregnating the gas diffusion layers 6 and 7 with a part of the rubber corresponding to the molding material of the gaskets 8 and 9 at a time of molding the gaskets 8 and 9, and these integrated products are bonded to an upper surface or a lower surface of the peripheral edge portion 3a of the electrolyte membrane 3 by a thermo compression bonding means with a hot press. Accordingly, the fuel battery constituting part 1 mentioned above is the integrally formed product of the electrolyte membrane 3, the electrodes with catalyst 4 and 5, the gas diffusion layers 6 and 7, and the gaskets 8 and 9, and the integrally formed product is inserted and held between a pair of separators 10 and 11 in a non-bonding manner as shown in FIG. 3. Groove-shaped recess portions 10a and 11a for positioning the gaskets 8 and 9 so as to pressure contact them are provided in the separators 10 and 11.

In the fuel battery constituting part 1 having the structure mentioned above, since the electrolyte membrane 3, the electrodes with catalyst 4 and 5, the gas diffusion layers 6 and 7, and the gaskets 8 and 9 are integrally formed in the manner mentioned above, it is possible to reduce steps of assembling these parts with each other at a time of assembling of the fuel battery.

Further, since the electrolyte membrane 3 is included in these parts, and the electrolyte membrane 3 is kept in a flat shape by the other parts, it is possible to prevent wrinkles from being generated at a time of assembling the electrolyte membrane 3.

Further, since a part of the rubber forming the gaskets 8 and 9 is impregnated into the gas diffusion layers 6 and 7, whereby the gaskets 8 and 9 and the gas diffusion layers 6 and 7 are integrated, the gaskets 8 and 9 and the gas diffusion layers 6 and 7 have a structure in which they closely contact with each other. Accordingly, it is possible to prevent a space constituting a short cut flow passage for the gas from being formed between the gaskets 8 and 9 and the gas diffusion layers 6 and 7.

Further, since the gaskets 8 and 9 are bonded to the upper surface and the lower surface of the peripheral edge portion 3a of the electrolyte membrane 3 by the thermo compression bonding means with the hot press, the gaskets 8 and 9 and the electrolyte membrane 3 have a structure in which they closely contact with each other. Accordingly, it is possible to prevent a gas leaking flow passage from being formed between the gaskets 8 and 9 and the electrolyte membrane 3.

Second Embodiment

Figure 4:
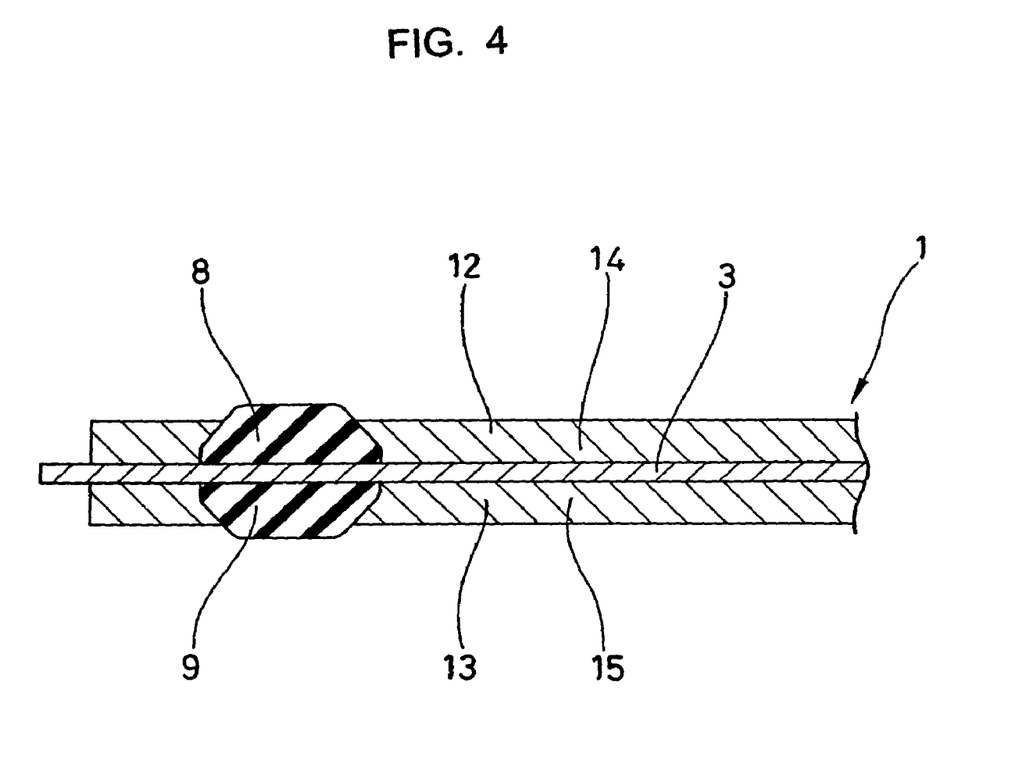
FIG. 4 is a cross sectional view of a main portion of a constituting part for a fuel battery in accordance with a second embodiment of the present invention.
Figure 5:
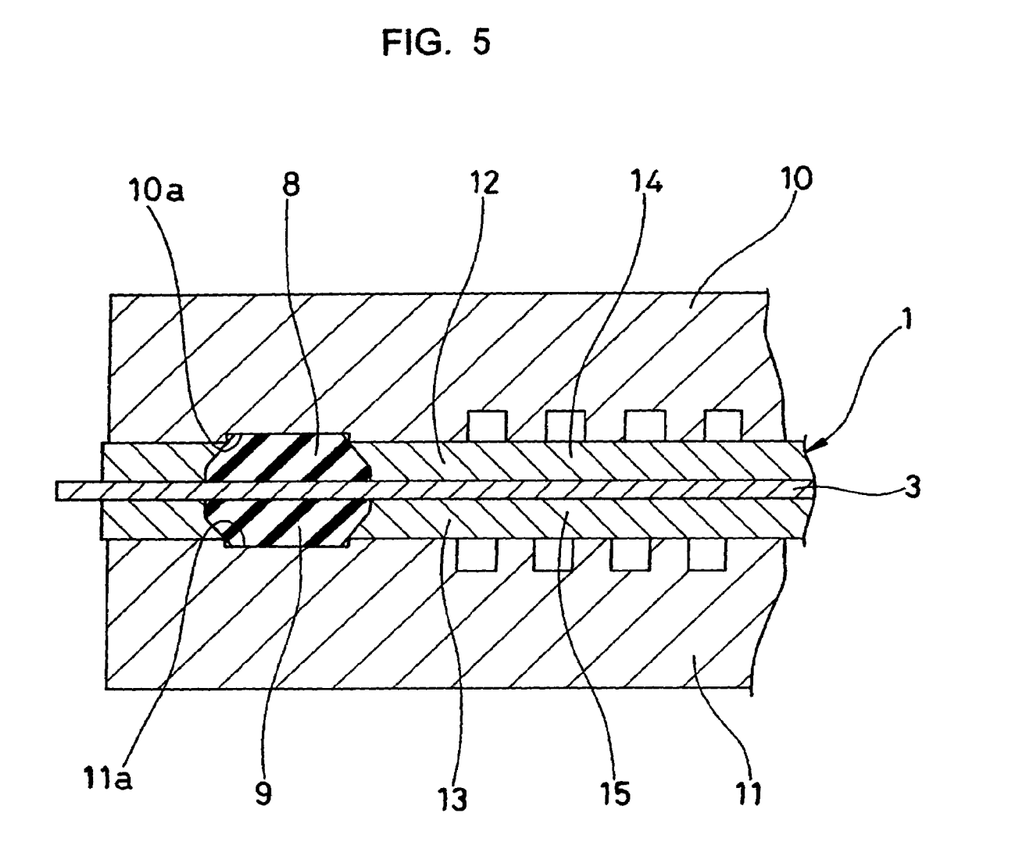
FIG. 5 is a cross sectional view of a main portion showing an assembling state of the constituting part for the fuel battery.

FIG. 4 shows a cross sectional view of a constituting part 1 for a fuel battery in accordance with a second embodiment of the present invention. Further, FIG. 5 shows a cross sectional view of an assembling state of the constituting part 1 for the fuel battery, and reference numerals 10 and 11 in FIG. 5 denote separators combined with the fuel battery constituting part 1.

The fuel battery constituting part 1 in accordance with the embodiment mentioned above is structured as follows.

That is, at first, the electrolyte membrane 3 made of the solid high polymer provided with a predetermined plane shape is provided, electrodes 14 and 15 doubling as gas diffusion layers 12 and 13 made of a carbon fiber, and the gaskets 8 and 9 made of a liquid rubber cured material are respectively bonded to each of both surfaces of the electrolyte membrane 3.

A combination of the gas diffusion layer 12 and the gasket 8 in the upper side in the drawing, and a combination of the gas diffusion layer 13 and the gasket 9 in the lower side in the drawing are respectively integrated by impregnating the gas diffusion layers 12 and 13 with a part of the rubber corresponding to the molding material of the gaskets 8 and 9 at a time of molding the gaskets 8 and 9, and these integrated products are bonded to an upper surface and a lower surface of the electrolyte membrane 3 by a thermo compression bonding means with a hot press. Accordingly, the fuel battery constituting part 1 mentioned above is the integrally formed product of the electrolyte membrane 3, the electrodes 14 and 15 doubling as the gas diffusion layers 12 and 13, and the gaskets 8 and 9, and the integrally formed product is inserted and held between a pair of separators 10 and 11 in a non-bonding manner as shown in FIG. 5. Groove-shaped recess portions 10a and 11a for positioning the gaskets 8 and 9 so as to pressure contact them are provided in the separators 10 and 11.

In the fuel battery constituting part 1 having the structure mentioned above, since the electrolyte membrane 3, the electrodes 14 and 15 doubling as the gas diffusion layers 12 and 13, and the gaskets 8 and 9 are integrally formed in the manner mentioned above, it is possible to reduce steps of assembling these parts with each other at a time of assembling of the fuel battery.

Further, since the electrolyte membrane 3 is included in these parts, and the electrolyte membrane 3 is kept in a flat shape by the other parts, it is possible to prevent wrinkles from being generated at a time of assembling the electrolyte membrane 3.

Further, since a part of the rubber forming the gaskets 8 and 9 is impregnated into the gas diffusion layers 12 and 13, whereby the gaskets 8 and 9 and the gas diffusion layers 12 and 13 are integrated, the gaskets 8 and 9 and the gas diffusion layers 12 and 13 have a structure in which they closely contact with each other. Accordingly, it is possible to prevent a space constituting a short cut flow passage for the gas from being formed between the gaskets 8 and 9 and the gas diffusion layers 12 and 13.

Further, since the gaskets 8 and 9 are bonded to the upper surface and the lower surface of the electrolyte membrane 3 by the thermo compression bonding means with the hot press, the gaskets 8 and 9 and the electrolyte membrane 3 have a structure in which they closely contact with each other. Accordingly, it is possible to prevent a gas leaking flow passage from being formed between the gaskets 8 and 9 and the electrolyte membrane 3.

Third Embodiment

Figure 6:
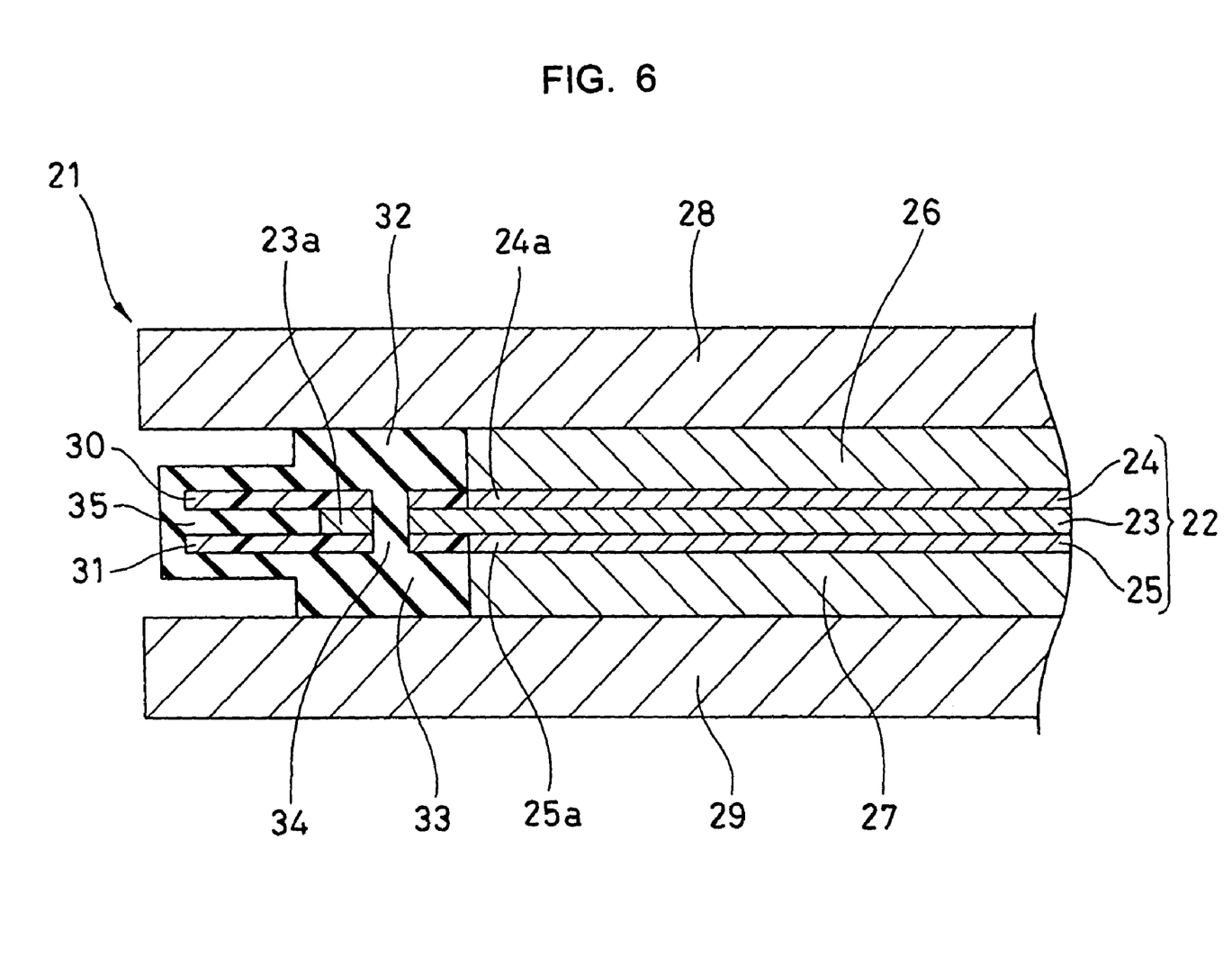
FIG. 6 is a cross sectional view of a main portion of a constituting part for a fuel battery in accordance with a third embodiment of the present invention.

FIG. 6 shows a cross section of a constituting part 21 for a fuel battery (cell seal for the fuel battery) in accordance with a third embodiment of the present invention, and this fuel battery constituting part 21 is structured as follows.

That is, at first, a reaction electrode portion (MEA) 22 integrated by laying electrodes with catalyst (catalyst layers) 24 and 25 on both the upper and lower sides of an electrolyte membrane (ion exchange membrane) 23 is provided, gas diffusion layers (GDL) 26 and 27 are layered in both the upper and lower sides of the reaction electrode portion 22 in a non-bonded manner, and separators 28 and 29 are further layered in both the upper and lower sides of the gas diffusion layers 26 and 27 in a non-bonded manner, whereby a laminated body corresponding to 1 cell is structured.

A plane area of the reaction electrode portion 22 is formed to be smaller than the conventional one, and frames 30 and 31 made of a resin film such as the PI, the PEN, the PET or the like are fixed to a peripheral edge portion of the reaction electrode portion 22 in such a manner as to just compensate the reduced portion. In the peripheral edge portion of the reaction electrode portion 22, since a peripheral edge portion 23a of the electrolyte membrane 23 protrudes out in a plane direction beyond peripheral edge portions 24a and 25a of the electrodes with catalyst 24 and 25, the frames 30 and 31 are respectively layered in both the upper and lower sides of the peripheral edge portion 23a of the electrolyte membrane 23, and are respectively thermally compression bonded to the peripheral edge portion 23a of the electrolyte membrane 23. The frames 30 and 31 have substantially the same thickness as that of the electrodes with catalyst 24 and 25.

Gaskets (seals) 32 and 33 made of a liquid rubber cured material such as a silicone rubber, an EPDM, an FKM or the like are respectively provided in the upper side of the frame 30 in the upper side in the drawing and the lower side of the frame 31 in the lower side in the drawing (respectively provided in the outer peripheral sides of the gas diffusion layers 26 and 27, between the frame 30 in the upper side in the drawing and the separator 28 and between the frame 31 in the lower side in the drawing and the separator 29), and the gaskets 32 and 33 are integrated with the frame 30 and 31 and the gas diffusion layers 26 and 27 due to an impregnation of a part of the liquid rubber into the frames 30 and 31 and the gas diffusion layers 26 and 27 with which the gaskets are in contact. Since the frames 30 and 31 are fixed to the reaction electrode portion 22 in accordance with the thermo compression bonding in the manner mentioned above, the reaction electrode portion 22, the frames 30 and 31, the gaskets 32 and 33 and the gas diffusion layers 26 and 27 are combined and integrated on the basis of the impregnation mentioned above. The gaskets 32 and 33 closely contact with the separators 28 and 29.

Further, through holes 34 are provided in the peripheral edge portion 23a of the electrolyte membrane 23 and the upper and lower frames 30 and 31 so as to communicate in a vertical direction, and a part of the liquid rubber is charged into the through holes 34, whereby the upper and lower gaskets 32 and 33 are directly integrated. A plurality of through holes 34 are provided along the peripheral edge of the electrolyte membrane 23 at a predetermined interval, and, in each of a plurality of through holes 34, a part of the liquid rubber is charged, and the upper and lower gaskets 32 and 33 are directly integrated.

Further, a coating portion 35 is integrally formed in the upper and lower gaskets 32 and 33 all around the periphery so as to cover the peripheral edge portion 23a of the electrolyte membrane 23 and the outer periphery of the upper and lower frames 30 and 31.

In the fuel battery constituting part 21 provided with the structure mentioned above, since the reaction electrode portion 22, the frames 30 and 31, the gaskets 32 and 33, and the gas diffusion layers 26 and 27 are previously combined and integrated in the manner mentioned above, it is possible to reduce an assembling man hour at a time of assembling of the cell or the stack, and since the plane area of the reaction electrode portion 22 is reduced at a degree at which the frames 30 and 31 are added, a rate at which the reaction electrode portion 22 corresponding to the expensive part is used is to be reduced, so that it is possible to reduce a parts cost.

Further, since the reaction electrode portion 22 and the outer periphery of the frames 30 and 31 are coated by the coating portion 35 integrally formed with the gaskets 32 and 33, it is possible to prevent the gas generated within the cell from leaking to the external from the outer periphery of the reaction electrode portion 22 and the frames 30 and 31, and since the rubber is charged into the through holes 34 provided in the reaction electrode portion 22 and the frames 30 and 31, whereby the reaction electrode portion 22 and the frames 30 and 31 are connected, it is possible to firmly fasten both of them.

Fourth Embodiment

In this case, as described above, there is a case that the gas diffusion layers 26 and 27 are not used in some kinds of the stack or the cell for the fuel battery, and in this case, the gas diffusion layers 26 and 27 are omitted from the description of the third embodiment mentioned above.

Fifth Embodiment

Figure 7:
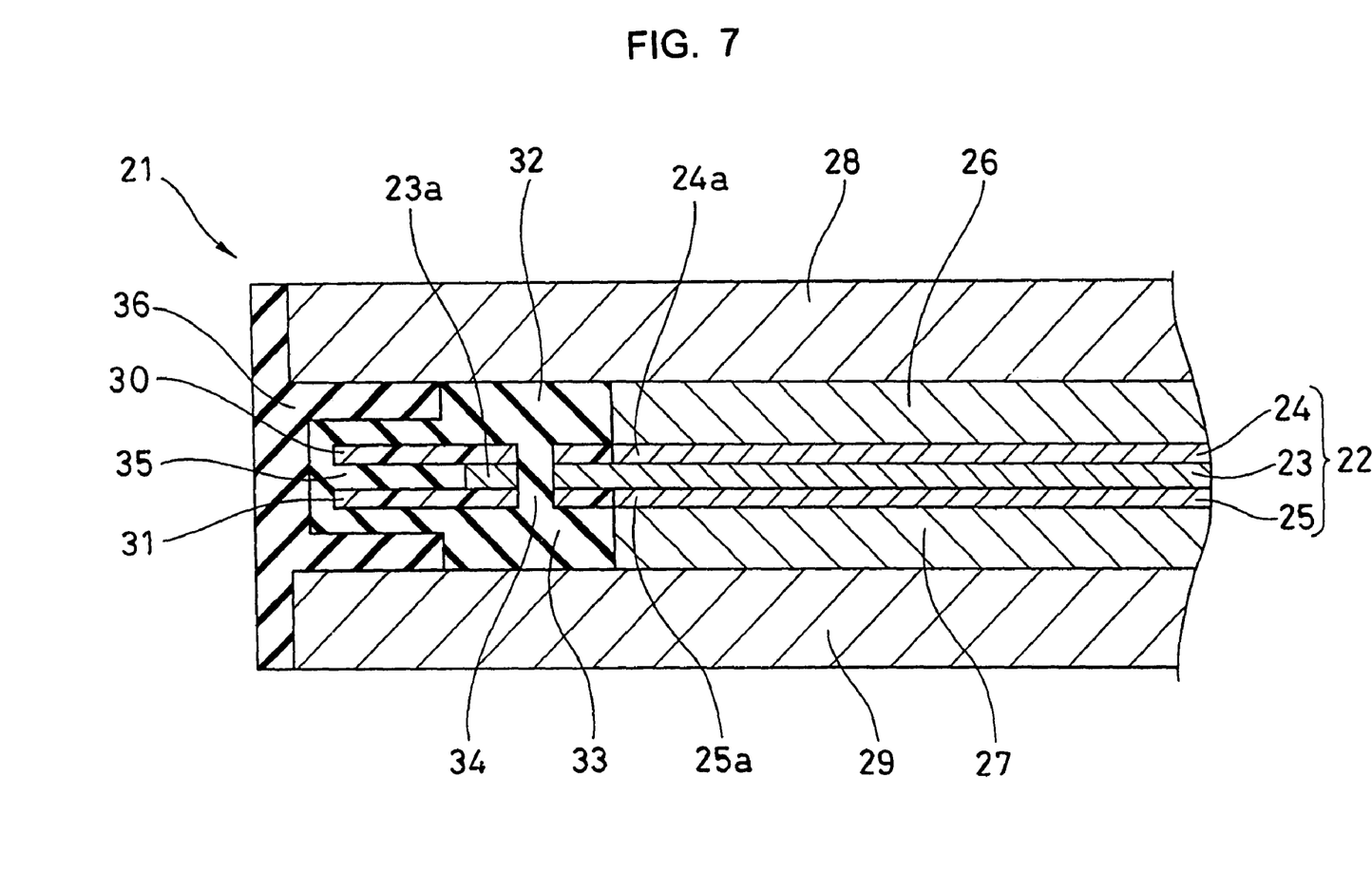
FIG. 7 is a cross sectional view of a main portion showing a constituting part for a fuel battery in accordance with a fifth embodiment of the present invention.

FIG. 7 shows a cross section of the constituting part 21 for the fuel battery (cell seal for the fuel battery) in accordance with a fifth embodiment of the present invention, and this fuel battery constituting part 21 is structured as follows.

That is, at first, a reaction electrode portion (MEA) 22 integrated by laying electrodes with catalyst (catalyst layers) 24 and 25 on both the upper and lower sides of an electrolyte membrane (ion exchange membrane) 23 is provided, gas diffusion layers (GDL) 26 and 27 are layered in both the upper and lower sides of the reaction electrode portion 22 in a non-bonded manner, and separators 28 and 29 are further layered in both the upper and lower sides of the gas diffusion layers 26 and 27 in a non-bonded manner, whereby a laminated body corresponding to 1 cell is structured.

A plane area of the reaction electrode portion 22 is formed to be smaller than the conventional one, and frames 30 and 31 made of a resin film such as the PI, the PEN, the PET or the like are fixed to a peripheral edge portion of the reaction electrode portion 22 in such a manner as to just compensate the reduced portion. In the peripheral edge portion of the reaction electrode portion 22, since a peripheral edge portion 23a of the electrolyte membrane 23 protrudes out in a plane direction beyond peripheral edge portions 24a and 25a of the electrodes with catalyst 24 and 25, the frames 30 and 31 are respectively layered in each of both the upper and lower sides of the peripheral edge portion 23a of the electrolyte membrane 23, and are respectively thermally compression bonded to the peripheral edge portion 23a of the electrolyte membrane 23. The frames 30 and 31 have substantially the same thickness as that of the electrodes with catalyst 24 and 25.

Gaskets (seals) 32 and 33 made of a liquid rubber cured material such as a silicone rubber, an EPDM, an FKM or the like are respectively provided in the upper side of the frame 30 in the upper side in the drawing and the lower side of the frame 31 in the lower side in the drawing (respectively provided in outer peripheral sides of the gas diffusion layers 26 and 27, between the frame 30 in the upper side in the drawing and the separator 28 and between the frame 31 in the lower side in the drawing and the separator 29), and the gaskets 32 and 33 are integrated with the frame 30 and 31, the gas diffusion layers 26 and 27 and the separators 28 and 29 due to an impregnation of a part of the liquid rubber into the frames 30 and 31, the gas diffusion layers 26 and 27 and the separators 28 and 29 with which the gaskets are in contact. Since the frames 30 and 31 are fixed to the reaction electrode portion 22 in accordance with the thermo compression bonding in the manner mentioned above, the reaction electrode portion 22, the frames 30 and 31, the gaskets 32 and 33, the gas diffusion layers 26 and 27 and the separators 28 and 29 are combined and integrated on the basis of the impregnation mentioned above.

Further, through holes 34 are provided in the peripheral edge portion 23a of the electrolyte membrane 23 and the upper and lower frames 30 and 31 so as to communicate in a vertical direction, and a part of the liquid rubber is charged into the through holes 34, whereby the upper and lower gaskets 32 and 33 are directly integrated. A plurality of through holes 34 are provided along the peripheral edge of the electrolyte membrane 23 at a predetermined interval, and, in each of a plurality of through holes 34, a part of the liquid rubber is charged, and the upper and lower gaskets 32 and 33 are directly integrated.

Further, a coating portion 35 is integrally formed in the upper and lower gaskets 32 and 33 all around the periphery so as to cover the peripheral edge portion 23a of the electrolyte membrane 23 and the outer periphery of the upper and lower frames 30 and 31, and a gas seal 36 formed by a material which is excellent in a gas impermeability in comparison with the gaskets 32 and 33 is provided in the outer periphery of the gaskets 32 and 33 including the coating portion 35 and the upper and lower separators 28 and 29 all around the periphery.

In the fuel battery constituting part 21 provided with the structure mentioned above, since the reaction electrode portion 22, the frames 30 and 31, the gaskets 32 and 33, the gas diffusion layers 26 and 27 and the separators 28 and 29 are previously combined and integrated in the manner mentioned above, it is possible to reduce an assembling man hour at a time of assembling of the cell or the stack, and since the plane area of the reaction electrode portion 22 is reduced at a degree at which the frames 30 and 31 are added, a rate at which the reaction electrode portion 22 corresponding to the expensive part is to be used is reduced, so that it is possible to reduce a parts cost.

Further, since the reaction electrode portion 22 and the outer periphery of the frames 30 and 31 are coated by the coating portion 35 integrally formed with the gaskets 32 and 33, it is possible to prevent the gas generated within the cell from leaking to the external from the outer periphery of the reaction electrode portion 22 and the frames 30 and 31, and since the rubber is charged into the through holes 34 provided in the reaction electrode portion 22 and the frames 30 and 31, whereby the reaction electrode portion 22 and the frames 30 and 31 are connected, it is possible to firmly fasten both of them.

Further, since the gas seal 36 formed by the material which is excellent in the gas impermeability in comparison with the gaskets 32 and 33 is provided in the outer periphery of the gaskets 32 and 33 including the coating portion 35 and the separators 28 and 29, it is possible to prevent the gas from leaking to the external due to the gas seal 36 even when the gas impermeability of the gaskets 32 and 33 is not good enough.

Sixth Embodiment

In this case, as described above, there is a case that the gas diffusion layers 26 and 27 are not used in some kinds of the stack or the cell for the fuel battery, and in this case, the gas diffusion layers 26 and 27 are omitted from the description of the fifth embodiment mentioned above.

EFFECT OF THE INVENTION AND INDUSTRIAL APPLICABILITY

The present invention achieves the following effects.

That is, at first, in the constituting part for the fuel battery in accordance with the first aspect of the present invention provided with the structure mentioned above, since the structure is made such that the gas diffusion layers formed of the carbon fiber or the like and the gaskets are bonded to the integrated product of the electrolyte membrane and the electrodes with catalyst, in the constituting part for the fuel battery having the electrodes with catalyst in the both pole sides of the electrolyte membrane and provided with the gas diffusion layers in both the outer sides thereof, it is possible to reduce the steps of assembling these parts with each other at a time of assembling of the fuel battery. Accordingly, it is possible to make the assembling operation of the fuel battery easy. Further, since these parts are integrated, it is possible to improve the sealing property obtained by the gasket.

Further, in the constituting part for the fuel battery in accordance with the second aspect of the present invention provided with the structure mentioned above, since the structure is made such that the integrated product of the gas diffusion layers and the gaskets, the gas diffusion layers being made of the carbon fiber or the like and impregnated with the rubber, and forming the gaskets is bonded to the integrated product of the electrolyte membrane and the electrodes with catalyst, in the constituting part for the fuel battery having the electrodes with catalyst in both the pole sides of the electrolyte membrane, and provided with the gas diffusion layers in both the outer sides thereof, it is possible to reduce the steps of assembling these parts with each other at a time of assembling of the fuel battery. Accordingly, it is possible to make the assembling operation of the fuel battery easy. Further, since these parts are integrated, it is possible to improve the sealing property obtained by the gasket.

Further, in the constituting part for the fuel battery in accordance with the third aspect of the present invention provided with the structure mentioned above, since the structure is made such that the integrated product of the gas diffusion layers and the gaskets is bonded to the electrolyte membrane the gas diffusion layers being impregnated with the rubber and forming the gaskets, in the constituting part for the fuel battery provided with the electrodes doubling as the gas diffusion layers in both the sides of the electrolyte membrane, it is possible to reduce the steps of assembling these parts with each other at a time of assembling of the fuel battery. Accordingly, it is possible to make the assembling operation of the fuel battery easy. Further, since these parts are integrated, it is possible to improve the sealing property obtained by the gasket.

Further, each of the inventions in accordance with the aspects mentioned above is particularly effective by the matters that the integrated product is bonded by using the hot press (the fourth aspect), the electrolyte membrane is constituted of the high polymer electrolyte (the fifth aspect), or the rubber is the liquid rubber (the sixth aspect).

Further, in the constituting part for the fuel battery in accordance with the seventh aspect of the present invention provided with the structure mentioned above, the reaction electrode portion, the gas diffusion layers and the gaskets are integrated, and in the constituting part for the fuel battery in accordance with the ninth aspect, the reaction electrode portion, the frames, the gaskets and the gas diffusion layers are integrated by fixing the frame to the reaction electrode portion, covering the frames by the rubber and impregnating the gas diffusion layers with a part of the rubber. Accordingly, in each of the cases, it is possible to reduce the assembling man hour at a time of assembling of the cell or the stack. Further, in the constituting part for the fuel battery in accordance with the eighth aspect, since it is possible to reduce the plane area of the reaction electrode portion at a degree at which the frame is added, a rate at which the reaction electrode portion corresponding to the expensive part is to be used is reduced, and it is accordingly possible to reduce the part cost.

Further, in the constituting part for the fuel battery in accordance with the tenth aspect, the reaction electrode portion and the gaskets are integrated, and in the constituting part for the fuel battery in accordance with the twelfth aspect, the reaction electrode portion, the frames and the gaskets are integrated by fixing the frames to the reaction electrode portion and impregnating with the rubber so as to cover the frames. Accordingly, in each of the cases, it is possible to reduce the assembling man hour at a time of assembling of the cell or the stack. Further, in the constituting part for the fuel battery in accordance with the eleventh aspect, since it is possible to reduce the plane area of the reaction electrode portion at a degree at which the frame is added, a rate at which the reaction electrode portion corresponding to the expensive part is used is to be reduced, and it is accordingly possible to reduce the part cost.

Further, in the constituting part for the fuel battery in accordance with the thirteenth aspect, since the reaction electrode portion and the outer periphery of the frames are coated by the rubber, it is possible to restrict the gas generated within the cell from leaking from the outer periphery of the reaction electrode portion and the frames to the external, and in the constituting part for the fuel battery in accordance with the fourteenth aspect, since the reaction electrode portion and the frames are connected by charging the rubber into through holes provided in the reaction electrode portion and the frames, it is possible to firmly fasten the reaction electrode portion and the frames.

Further, in the constituting part for the fuel battery in accordance with the fifteenth aspect, since the reaction electrode portion, the frames, the gaskets, the gas diffusion layers and the separators are integrated by also impregnating the separators with the rubber, in the constituting part for the fuel battery as recited in the ninth aspect mentioned above, it is possible to integrate parts group including the separators, and further in the constituting part for the fuel battery in accordance with the sixteenth aspect, since the reaction electrode portion, the frames, the gaskets and the separators are integrated by also impregnating the separator with the rubber, in the constituting part for the fuel battery as recited in the twelfth aspect mentioned above, it is also possible to integrate the parts group including the separators.

Further, in the constituting part for the fuel battery in accordance with the seventeenth aspect, since the gas seal made of the material excellent in the gas impermeability rather than the gasket is provided in the outer periphery of the gaskets, in the constituting part for the fuel battery as recited in the fifteenth aspect or the sixteenth aspect mentioned above, it is possible to prevent the gas from leaking to the external for the sake of the gas seal, even when the gas impermeability of the gasket is not good enough.

What is claimed is:

1. A constituting part for a fuel battery, comprising a reaction electrode portion, gas diffusion layers, gaskets made of liquid rubber cured material and frames made of resin film; wherein the frames are fixed to an outer periphery of the reaction electrode portion by a heat-processing manner so as to expand a plane area of the reaction electrode portion; wherein the reaction electrode portion and frames are provided with through holes communicated with each other; wherein the through holes are filled with a part of a liquid rubber and the frames are covered with the liquid rubber thereby coupling the reaction electrode portion and frames to each other and forming the gaskets; and wherein the reaction electrode portion, the frames, the gaskets and the gas diffusion layers are integrated to one another by impregnating the gas diffusion layers with a part of the liquid rubber.

2. The constituting part for a fuel battery as claimed in claim 1, wherein a separator is disposed on each of upper and lower sides of an integrated assembly including the reaction electrode portion, the frames, the gaskets, the gas diffusion layers; and wherein the separators and integrated assembly are integrated to each other by impregnating the separators with the liquid rubber.

3. The constituting part for a fuel battery as claimed in claim 2, characterized in that a gas seal made of a material with a higher gas impermeability than that of the gaskets is provided in an outer periphery of the gaskets, so that gas-leaking is prevented by the gas seal.

* * * * *